(12) United States Patent
Fairbanks et al.

(10) Patent No.: US 8,023,555 B2
(45) Date of Patent: Sep. 20, 2011

(54) REPEATER CIRCUIT

(75) Inventors: Scott M. Fairbanks, Corvallis, OR (US); William S. Coates, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1026 days.

(21) Appl. No.: 11/863,368

(22) Filed: Sep. 28, 2007

(65) Prior Publication Data

US 2009/0086793 A1   Apr. 2, 2009

(51) Int. Cl.
*H04B 3/36* (2006.01)
*H04B 17/02* (2006.01)
*H04L 25/20* (2006.01)
*H04L 25/52* (2006.01)

(52) U.S. Cl. .................. 375/211; 327/165; 323/282
(58) Field of Classification Search ............ 375/211; 327/165–169; 323/282
See application file for complete search history.

(56) References Cited

U.S. PATENT DOCUMENTS

| | | | |
|---|---|---|---|
| 2002/0039033 A1* | 4/2002 | Sutherland et al. | 326/121 |
| 2005/0270067 A1* | 12/2005 | Masleid et al. | 326/121 |

* cited by examiner

*Primary Examiner* — Curtis Odom
(74) *Attorney, Agent, or Firm* — Brooks Kushman P.C.

(57) ABSTRACT

A repeater circuit configured to duplicate or otherwise coordinate signal transitions between state conductors, such as for use in asynchronous communication systems. The repeater circuit may include a state node or other feature to facilitate enforcing or otherwise ordering transitioning of the state conductors.

20 Claims, 5 Drawing Sheets

REPEATER CIRCUIT

BACKGROUND OF THE INVENTION

1. Field of the Invention

The present invention relates to repeater circuits, such as but not limited to those suitable for use with single track handshaking wires.

2. Background Art

A repeater circuit can be used with single track handshaking wires and other transmission mediums to facilitate transmitting signals from one location on a "left" side of the repeater to another location on a "right" side of the repeater. One optional and commonly used configuration may include the repeater pulling up/down the right side if an external circuit pulls up/down the left side and/or pulling down/up the left side if an external circuit pulls down/up the right side. This type of an arrangement may be suitable for use with GasP, other single wire handshake communication protocols, and other circuits where a request signal is used to pull up the left side of the repeater and a subsequent acknowledge signal is used to pull down the right side after the repeater relays the request signal to the right side, i.e., after the right side is pulled up.

DETAILED DESCRIPTION

Figure 1:
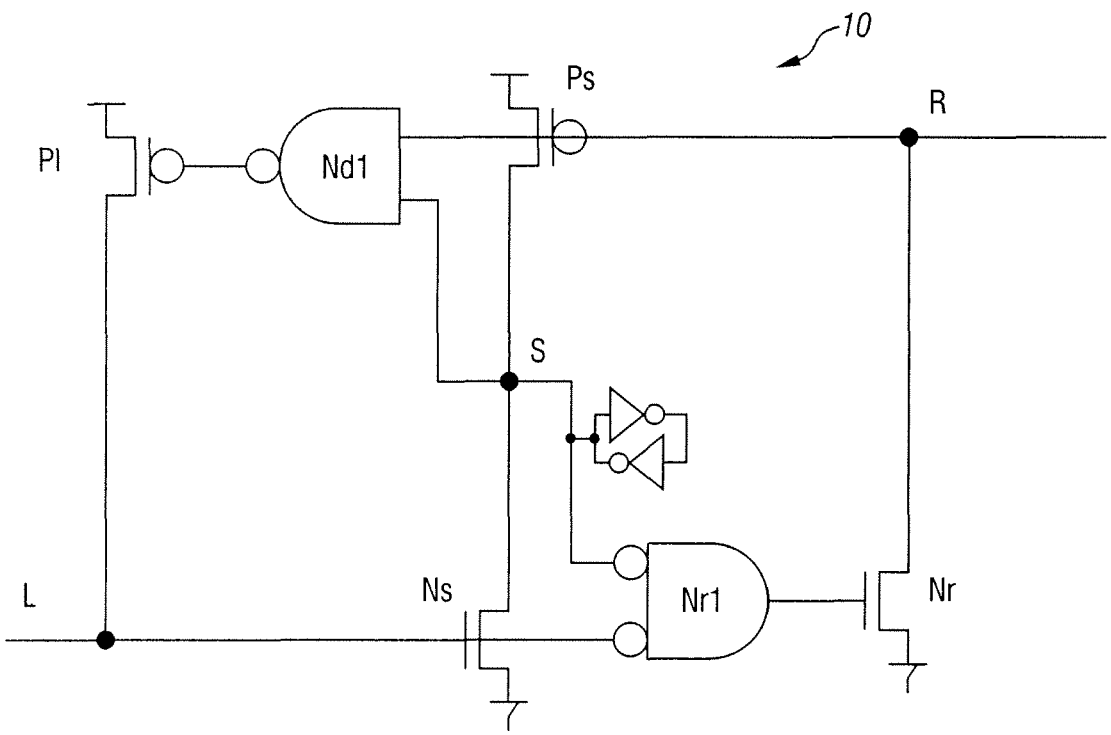
FIGS. 1-6 illustrate a number of repeater circuits.

FIG. 1 illustrates a repeater circuit 10 configured to duplicate signal transitions on either a left side state conductor L or a right side state conductor R to the other. The repeater circuits 10 is predominately described with respect to duplicating a request transition on the left side L to the right side R and duplicating or simulating an acknowledge request from the right side R to the left side L. This methodology may be employed in systems having asynchronous hand-shaking protocols, such as but not limited to GasP systems, and other systems where receipt of a request signals is typically replied to with an acknowledge signal. Of course, the repeater circuit 10 is not intended to be so limited and fully contemplates its use and application to any type of circuit arrangement.

The state conductors L, R may be connected to any type of external elements suitable for use with the repeater 10. The external circuits may be configured to indicate the request signals with a falling transition, or low, and the acknowledge signal with a rising transition, or high. The transitions may be generally described as changing the state of the conductors, i.e., from a high to low or from a low to high. Upon the left side L receiving the falling transition, a NOR gate Nr1 receives a low input from the left state conductor L and another low input from a state node S, which in turn causes the NOR gate Nr1 to activate n-type transistor Nr to pull the right state conductor R low, thereby duplicating the falling transition on the left state conductor L to the right state conductor R.

A master clear or other feature (not shown) may be included to initially set the state node S to a desired high or low value depending on the transitioning state of the left and right state conductors. If the left and right terminals are high at start-up, then the state node S should be cleared to low. The terminal, in this case the left terminal L that connects to the input of the NOR gate Nr1, must receive the first transition and it must be a rising transition. Once the request signal is duplicated to the right state conductor R, the P-type transistor Ps is activated to pull the state node S from its previous low state to a high state. A keeper circuit may be include to maintain this state until the repeater 10 receives the next transition signal. After each transition occurs, the state of node S changes. The purpose of this state node S is to remember the last transition that is repeated and to enforce what the next transition must be, i.e. after a rising transition on the left terminal L is repeated to the right terminal R, the next transition to be repeated must originate on the right terminal R, be repeated to the left terminal L, and be a falling transition. The transition of the state node after duplicating the rising transition to the right state conductor and maintaining the transition state of the state node allows for maintaining state.

The external circuit associated with the right state conductor R may instigate a transition on the right state conductor R in order to acknowledge receipt of the request signal, which in this case requires transitioning the right state conductor from a low to a high. The high transition of the right side state conductor R and the high value at the state node S activates a NAND gate Nd1 to activate a P-type transistor P1, which in turns pulls the left side state conductor L high, thereby duplicating the rising transition on the right state conductor R to the left side state conductor L. The high transition on the left side state conductor L then activates an n-type transistor Ns to pull the state node S back low, thereby setting the repeater 10 to subsequently duplicate another falling transition from the left side state conductor L to the right side state conductor R.

Figure 2:
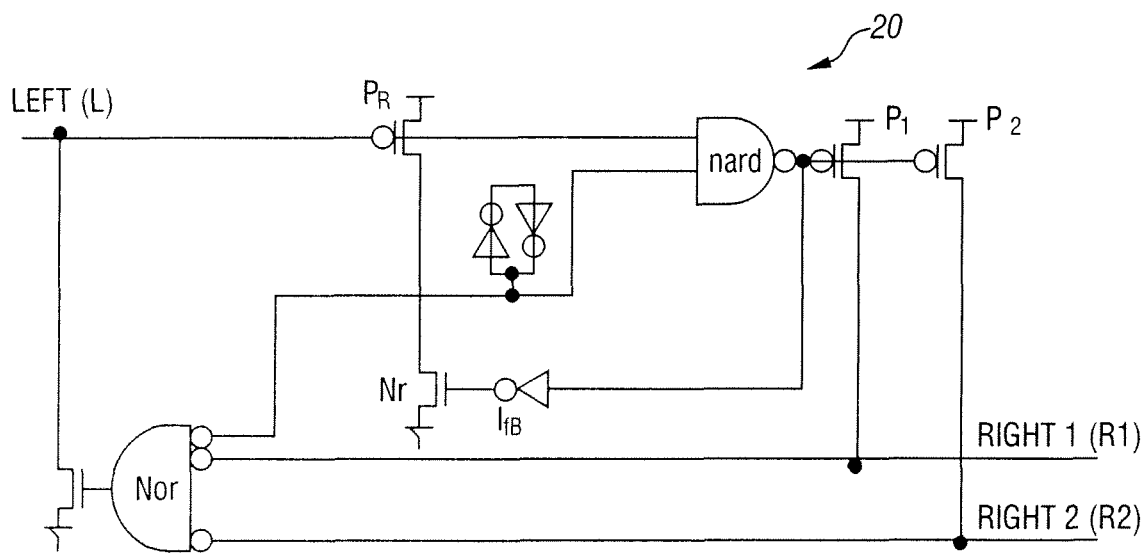

FIG. 2 illustrates a repeater circuit 20 configured to copy a request transition on a left state conductor L to right state conductors R1 and R2. The repeater 20 may be further configured to wait for acknowledge transitions on both of the first and second right state conductors R1 and R2 before instigating the acknowledge transition on the left state conductor L.

A transistor n1 may be included for transitioning the left conductor L from a high state to a low state in order to communicate an acknowledge signal from the right side. The pull of the transistor n1 is opposite to the pull of the associated external element that pulls the left conductor L from low to high when sending the request signal. Transistors p1, p2 may be included for respectively transitioning the right state conductors R1, R2 from a low to high when communicating the request signal from the left side. The pull of the transistors p1, p2 is opposite to the pull of the associated external element that pulls the conductors R1, R2 from high to low when sending the acknowledge signal.

A state node S and keeper circuit k may be included to add state to the repeater 20. The state of the state node may be used to selectively enable the transistors n1, p1, and p2. The transistor n1 may be used to transition the first state conductor to indicate an acknowledge signal from either one of the right side state conductors R1, R2 if the state node is low and the external elements transition both the state conductors R1, R2 to send the acknowledge signal. The transistors p1, p2 may be used in a similar manner to transition the right state conductors R1, R2 to indicate the request signal from the left side if the state node S is high and the external element transitions the left state conductor L to communicate the request signal.

State transistors Ns, Ps may be included to manage the state of the state node s. The transistors Ns, Ps may be configured to pull the state node S between its high and low states. The state transistor Ps may be used to pull the state node to the high state if the transistor n1 transitions the left state conductor. The state transistor Ns may pull the state node S low if the transistors p1, p2 transition the right state conductors R1, R2.

Figure 3:
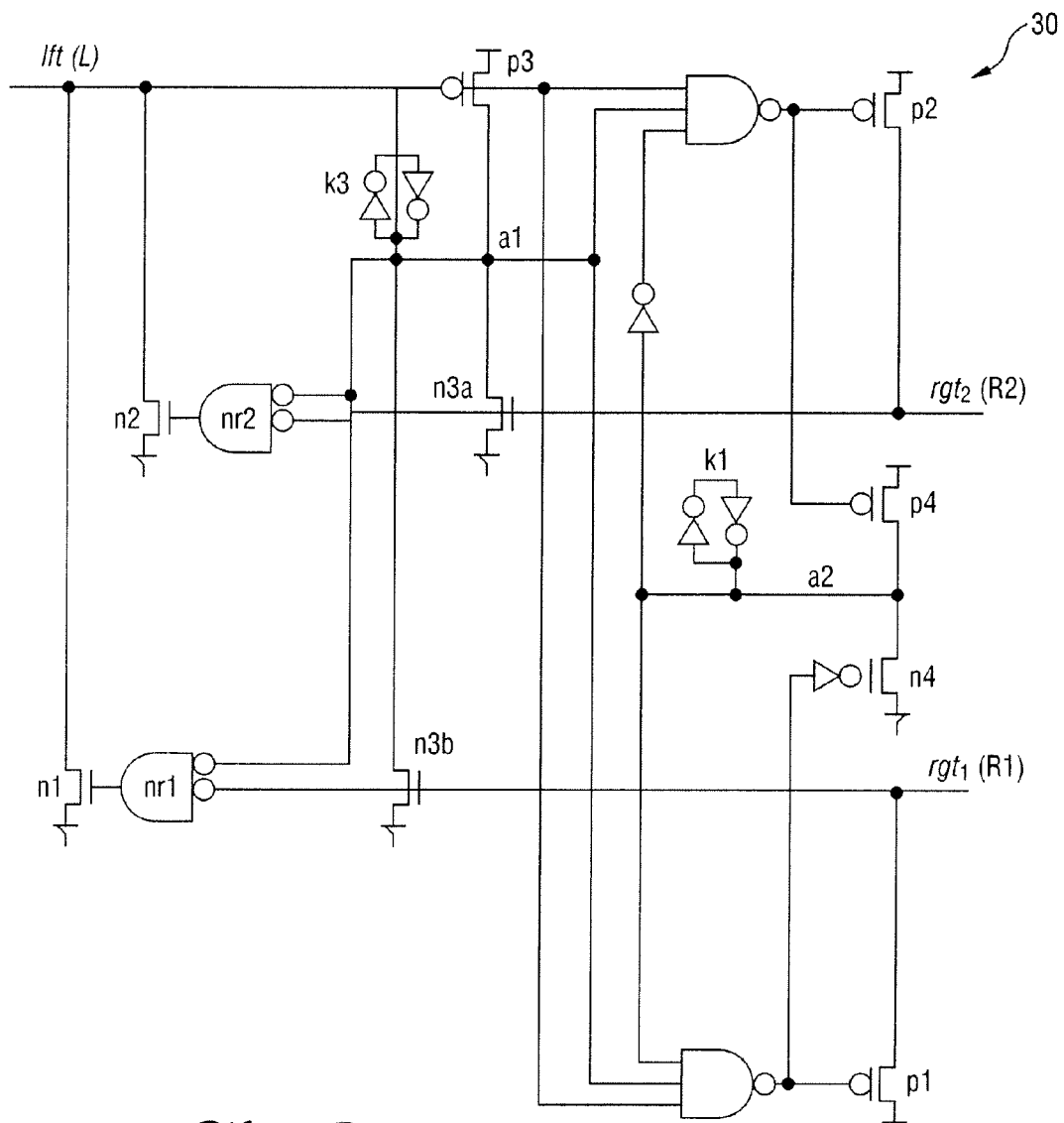

FIG. 3 illustrates a repeater circuit 30 configured such that transitions caused by one of the external elements on the left state conductor are alternately toggled to the two right state conductors R1, R2, such as to communicate the request signal from the left to the right side of the repeater 30. This may, for example, include communicating the request signal to state conductor R1 and then alternately communicating the next request signal to the state conductor R2. The acknowledge signals associated with each request signal may be communicated to the left state conductor L from the toggled to conductor R1, R2 such that only the conductor R1, R2 receiving the request signal is used to communicate the acknowledge signal.

Transistors n1, n2, p1, and p2 may be included for transitioning the conductors L, R1, and R2. The transistor n1 may be used to pull the left conductor L from high to low in order to communicate the acknowledge signal from one of the right conductors R1, R2. The pull of the transistor n1 is opposite to the pull of the associated external element that pulls the left conductor L from low to high when sending the request signal. Transistor p1, p2 may be included for respectively transitioning the right state conductors R1, R2 from a low to a high in order to communicate the request signal. The pull of the transistors p1, p2 is opposite to the pull of the associated external element that pulls the conductors R1, R2 from high to low when sending the acknowledge signal.

State nodes S1, S2 and keeper circuits k1, k2 may be included to add state to the repeater 30. The state of the state nodes S1, S2 may be used to selectively enable the transistors n1, p1, p2. The transistors and state nodes may be configured such that the transistors n1, n2 only transition the left state conductor to communicate the acknowledge signal if the state node S1 is low and the toggled to state conductor R1, R2, i.e., the conductor receiving the request signals, is transitioned by the external element used to the send the acknowledge signal. This allows the repeater 30 to require the acknowledge signal from the toggled to conductor R1, R2 receiving the request signal and not the other conductor R1, R2 that does not receive the request signal.

The transistor n1 may be used to pull the left conductor L low if the state node s1 is low and the external element transitions the conductor R1. The transistor n2 may be used to pull the left conductor L low if the state node S1 is low and the external element transition the conductor R2. The transistor p1 may be used to transition the conductor R1 if the state nodes S1, S2 are high and the external element transitions the conductor L high. The transistor p2 may be used to transition the conductor R2 if the state node S1 is high, the state node S2 is low, and the external element transitions the conductor L high.

Transistors n3a, n3b, p3, p4, and n4 may be included to manage the state of the state nodes S1, S2. The transistors may be configured to pull the state nodes S1, S2 between high and low states. The transistor p3 may be used to pull the state node S1 high if either of the transistors n1, n2 transitions the left conductor L. The transistor n3a, n3b may be used to pull the state node S1 low if with of the conductors R1, R2 are pulled high. The transistor p4 may be used to pull the state node S2 high if the transistor p2 transitions the conductor R2. The transistor n4 may be used to pull the state node S2 low if the transistor p1 transitions the conductor R1. This repeater 30 may provided the following order of events: L high, R1 high, R1 low, L low, L high, R2 high, R2 low, L low.

Figure 4:
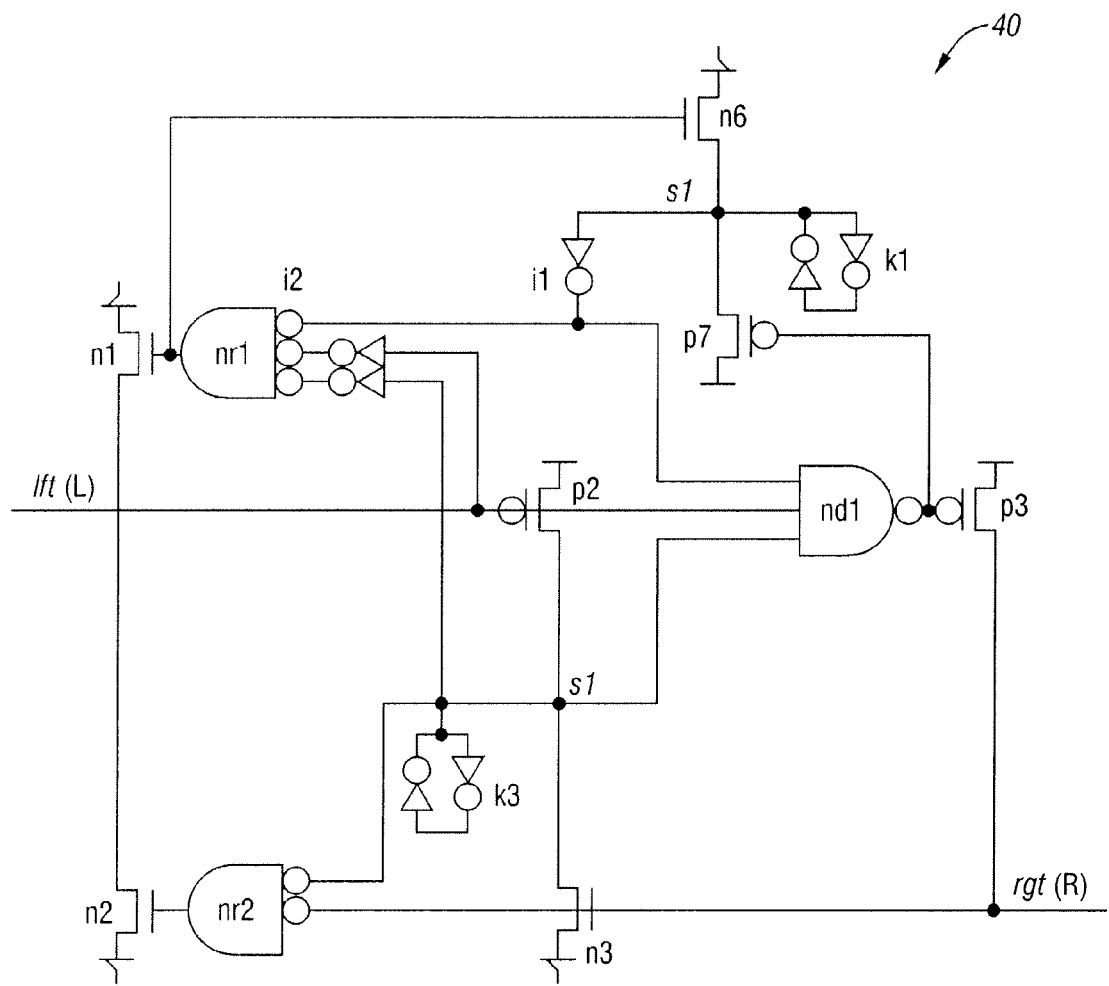

FIG. 4 illustrates a repeater circuit 40 configured such that a transition caused by the external element on the conductor L is duplicated to the conductor R and a second subsequent transition caused by the external element on the conductor L results in immediately transitioning of the conductor L without transitioning the conductor R. This arrangement may be used to communicate a request from the left to the right, receive a corresponding acknowledge from the right and communicate it to the left, then receive a second request on the left and immediately communicate an acknowledge to the left without ever communicating the request to the right upon receipt of the next request.

Transistors n1, n2, and p3 may be included for transitioning the conductors L, R. The transistors n1, n2 may be used to pull the left conductor L low when communicating the acknowledge signal. The pull of the transistor n1 is opposite to the pull of the associated external element that pulls the left conductor L high when sending the request signal. Transistor p3 may be included for transitioning the conductors R from a low to a high when communicating the request signal. The pull of the transistor p3 is opposite to the pull of the associated external element that pulls the conductors R1, R2 low when sending the acknowledge signal.

State nodes S1, S2, optionally with the assistance of keeper circuits k1, k2, may be included to hold state of the repeater 40. The state of the state nodes S1, S2 may be used to selectively enable the transistors n1, n2, p3. The transistor n2 may be used to pull the conductor L low if the state node S1 is low and external element pulls the conductor R low. The transistor n1 may be used to pull the conductor L low if the state nodes S1 and S2 are high and conductor L is high, which pulls the conductor L low without requiring the conductor R to communicate the acknowledge signal. The transistor p3 may be used to pull the conductor R high if the conductor L and state node S1 are high and the state node S2 is low. The state of the state nodes S1, S2, and in particular, S2, controls whether the conductor R receives the request signal and whether the acknowledge signal is received without transitioning the conductor r.

Transistors p2, n3, n6, and n7 may be included to manage the state of the state nodes S1, S2. The transistors may be configured to pull the state nodes S1, S2 between high and low states. The transistor p3 may be used to pull the state node S1 high if either one of the transistors n1, n2 pulls the conductor L low. The transistor n3 may be used to pull the state node S1 low if the conductor R is transitioned with an acknowledge signal. The transistor n6 may be used to pull the state node S2 low if the transistor n1 is used to transition the conductor L. The transistor p7 may be used to pull the state node S2 low if the transistor p3 is used to transition the conductor R.

Figure 5:
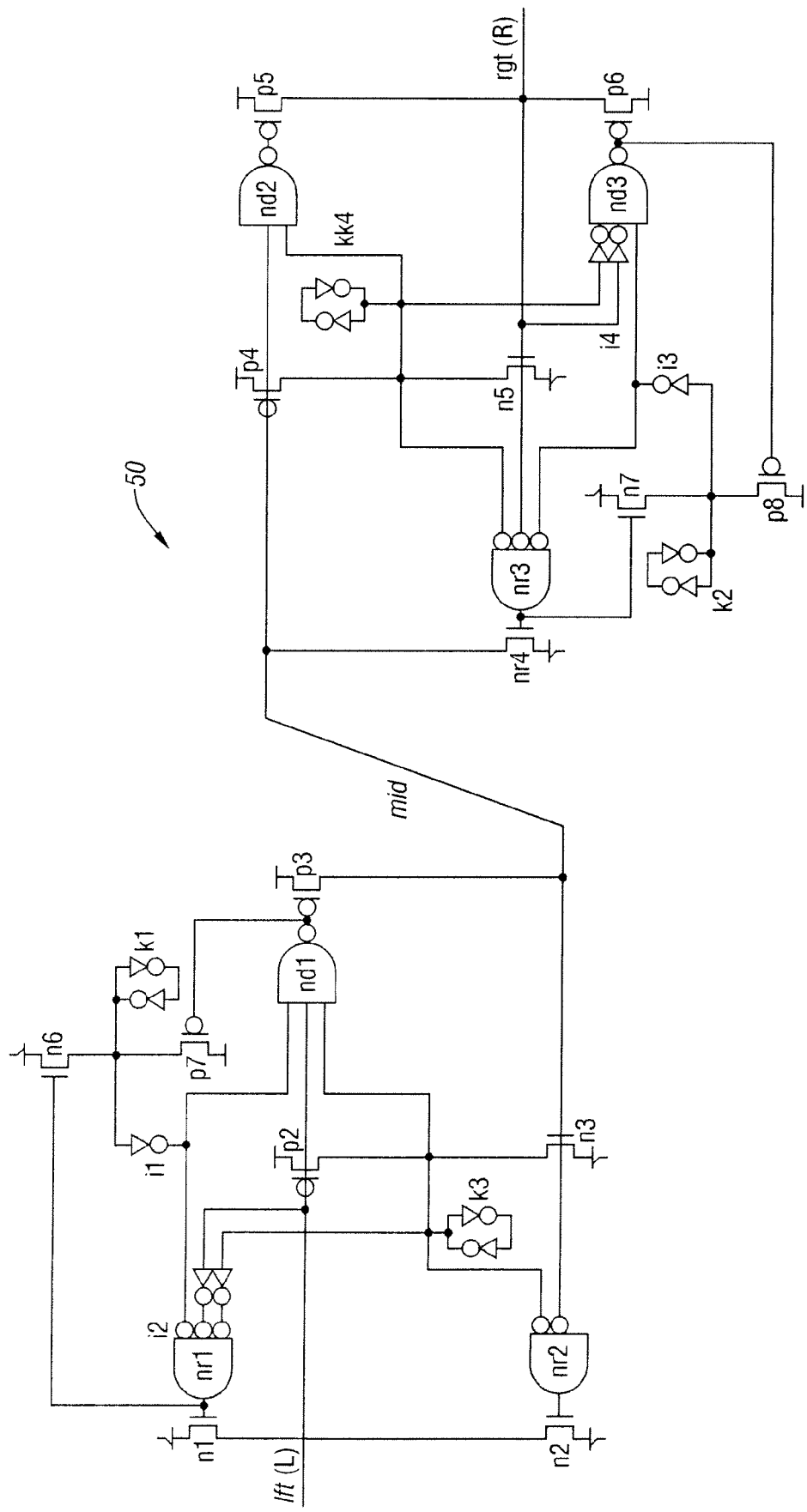

The use of the state nodes S1, S2 and the configuration of the various transistors allows the repeater 40 to operate in a system when each request must be answered with an acknowledgment. The repeater 40 is helpful in that each request is answered but only every other request is actually communicated to the right side. FIG. 5 illustrates a repeater circuit 50 having two the repeater 50 describer above with respect to FIG. 4. The additional repeater 50 adds an additional cycle to the cycle described above such that only every fourth request is communicated from the additional repeater circuit 50.

Figure 6:
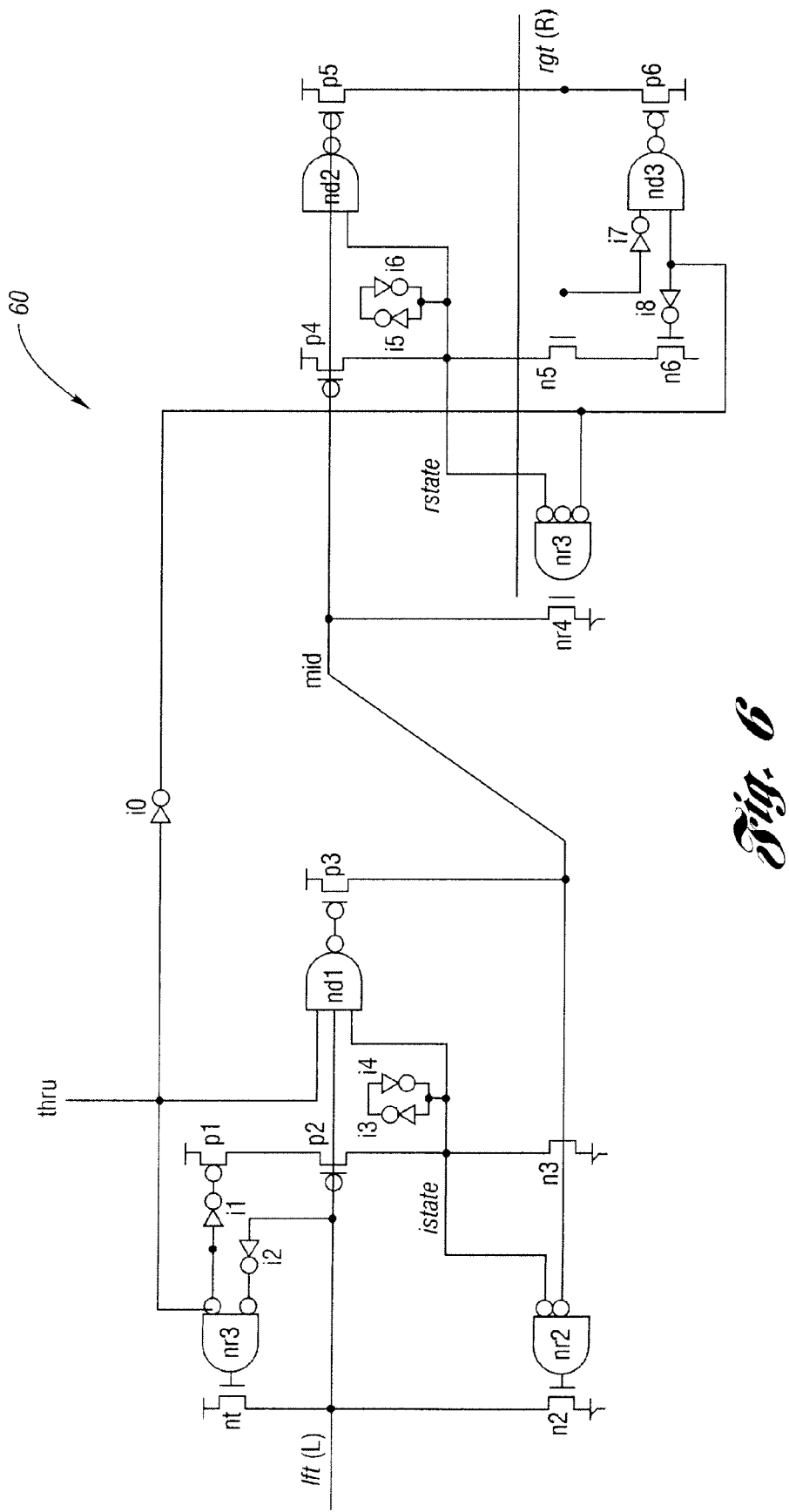

FIG. 6 illustrates another repeater circuit 60 configured to include a condition bit. The state of the condition bit can be used to allow or prohibit transitions caused by one of the external elements on one of the state conductors to be duplicated to the other state conductor.

As required, detailed embodiments are disclosed herein; however, it is to be understood that the disclosed embodiments are merely exemplary and they may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art.

While embodiments have been illustrated and described, it is not intended that these embodiments illustrate and describe all possible forms of the embodiments. Rather, the words used in the specification are words of description rather than limitation, and it is understood that various changes may be made without departing from the spirit and scope of the embodiments.

What is claimed is:

1. A repeater circuit comprising:
   a first switch for transitioning a first state conductor from a first state to a second state and an external element associated with the first state conductor for transitioning the first state conductor from the second state to the first state;
   a second switch for transitioning a second state conductor from a first state to a second state and an external element associated with the second state conductor transitioning the second state conductor from the second state to the first state; and
   a state node having a first or second state, the state of the state node selectively enable either the first or second switches to respectively transition the first or second state conductors.

2. The repeater of claim 1 wherein the switches and state node are configured such that transitions caused by one of the external elements on one of the state conductors is duplicated to the other state conductor.

3. The repeater of claim 2 wherein the first switch transitions the first state conductor if the state node has the first state and the external element transitions the second state conductor, and wherein the second switch transitions the second state conductor if the state node has the second state and the external element transitions the first state conductor.

4. The repeater of claim 3 further comprising a first and second state switch associated with the state node, the second state switch pulling the state node to the first state if the second switch transitions the second state conductor, the first state switch pulling the state node to the second state if the first switch transition the first state conductor.

5. The repeater of claim 1 further comprising a third switch for transitioning a third state conductor from a first state to a second state, the third state conductor associated with a third external element configured to transition the third state conductor from the second state to the first state, wherein the third switch transitions the third state conductor if the second switch transitions the second state conductor.

6. The repeater of claim 5 wherein the first switch transitions the first state conductor if the state node has the first state and the external elements transition the second and third state conductors, and wherein the second and third switches respectively transition the second and third state conductors if the state node has the second state and the external element transitions the first state conductor.

7. The repeater of claim 6 further comprising a first and second state switch associated with the state node, the second state switch pulling the state node to the second state if the first switch transition the first state conductor, the first state switch pulling the state node to the second state if the second and third switches transition the second and third state conductors.

8. The repeater of claim 2 further comprising a condition bit having a first or second state wherein the condition bit operates with the switches and state node to allow or prohibit transitions caused by one of the external elements on one of the state conductors to be duplicated to the other state conductor based on whether the conditions bit has the first or second state.

9. The repeater of claim 8 wherein the switches and the state nodes are configured such that a first transition caused by the external element on the first state conductor is duplicated to the second state conductor and a second subsequent transition caused by the external element on the first state conductor results in the first switch transitioning the first state conductor and no transitioning of the second state conductor.

10. The repeater of claim 1 further comprising a keeper circuit to maintain state of the state node.

11. A repeater circuit comprising:
    a first switch for transitioning a first state conductor from a first state to a second state and an external element associated with the first state conductor for transitioning the first state conductor from the second state to the first state;
    a second switch for transitioning a second state conductor from a first state to a second state and an external element associated with the second state conductor for transitioning the second state conductor from the second state to the first state; and
    a first and second state node having a first or second state, the state of the state nodes selectively enabling either the first or second switches to respectively transition the first or second state conductors.

12. The repeater of claim 11 further comprising further comprising a third switch for transitioning a third state conductor from a first state to a second state, the third state conductor associated with a third external element configured to transition the third state conductor from the second state to the first state, wherein the switches and the state nodes are configured such that transitions caused by one of the external elements on the first state conductor is alternately toggled to the second and third state conductors.

13. The repeater of claim 12 wherein the switches and state nodes are configured such that the first switch only transitions the first state conductor in if the toggled to state conductor is transitioned by the external element associated therewith.

14. The repeater of claim 12 further comprising a fourth switch for transition the first state conductor from the first state to the second state, the first switch transitioning the first state conductor if the first state node has the second state and the external element transitions the second state conductor, the fourth switch transitioning the first state conductor if the first state node has the second state and the external element transition the third state conductor, the second switch transitioning the second state conductor if the first and second state nodes have the first state and the external element transitions the first state conductor, the third switch transitioning the third state conductor if the first state node has the first state and the second state node has the second state and the external element transitions the first state conductor.

15. The repeater of claim 14 further comprising a first, second and third state switch associated with the first state node, the third state switch pulling the state node to the first state if either of the second or third switches transitions the first state conductor, the first state switch pulling the first state node to the second state if the external element transitions the third state conductor, the second state switch pulling the first state node to the second state if the external element transitions the second state conductor.

16. The repeater of claim 14 further comprising a fourth and fifth state switch associated with the second state node, the fourth state switch pulling the second state node to the first state if the third switch transitions the third state conductor, the fifth state switch pulling the second state node to the second state if the second switch transitions the second state conductor.

17. The repeater of claim 11 further comprising a third switch for transitioning the first state conductor from a first state to a second state, the first switch transitioning the first state conductor if the first state node has the second state and the external element transitions the second state conductor, the third switch transitioning the first state conductor if the first and second state nodes having the first state and the external element transitions the first state conductor, the second state switch transitioning the second state conductor if the first state node has the first state and the second state node has the second state and the external element transitions the first state conductor.

18. The repeater of claim 17 further comprising a first and second state switch associated with the first state element, the first state switch pulling the first state node to the first state if the first or third switches transitions the first state conductor, the second state switch pulling the first state node to the second state if the second switch transitions the second state conductor.

19. The repeater of claim 18 further comprising a third state switch and a fourth state switch associated with the second state node, the third state switch pulling the second state node to the second state if the third switch transitions the first state conductor, the fourth state switch pulling the second state node to the first state if the second switch transitions the second state conductor.

20. The repeater of claim 11 further comprising a keeper circuit to maintain the state of the state node.

* * * * *